United States Patent
Khanduja et al.

(10) Patent No.: US 9,917,741 B2
(45) Date of Patent: Mar. 13, 2018

(54) METHOD AND SYSTEM FOR PROCESSING NETWORK ACTIVITY DATA

(75) Inventors: Vaibhav Khanduja, Bangalore (IN); Srijay Jayapalan, Leinfelden-Echterdingen (DE); Stefan Bergstein, Cupertino, CA (US)

(73) Assignee: EntIT Software LLC, Sunnyvale, CA (US)

( * ) Notice: Subject to any disclaimer, the term of this patent is extended or adjusted under 35 U.S.C. 154(b) by 1594 days.

(21) Appl. No.: 12/548,987

(22) Filed: Aug. 27, 2009

(65) Prior Publication Data

US 2011/0055138 A1 Mar. 3, 2011

(51) Int. Cl.
- *G06F 17/00* (2006.01)
- *G06N 5/02* (2006.01)
- *H04L 12/24* (2006.01)
- *G06F 11/30* (2006.01)
- *H04L 12/26* (2006.01)

(52) U.S. Cl.
CPC .............. *H04L 41/16* (2013.01); *G06F 11/30* (2013.01); *H04L 41/0631* (2013.01); *H04L 43/00* (2013.01)

(58) Field of Classification Search
CPC ...................................................... G06F 11/30
USPC ............................................. 706/47; 709/224
See application file for complete search history.

(56) References Cited

U.S. PATENT DOCUMENTS

| | | | | |
|---|---|---|---|---|
| 7,720,779 B1 * | 5/2010 | Perry | ......................... | G06N 5/04 706/45 |
| 9,128,943 B1 * | 9/2015 | Khanduja | ......... | G06F 17/30091 |
| 9,129,973 B2 * | 9/2015 | Wang | ....................... | H01L 22/32 |
| 9,189,345 B1 * | 11/2015 | Khanduja | ............ | G06F 11/1464 |
| 9,218,251 B1 * | 12/2015 | Hemashekar | ........ | G06F 11/1458 |
| 9,438,476 B2 * | 9/2016 | Schlipf | ................ | H04L 41/0813 |
| 9,459,969 B1 * | 10/2016 | Hebbar | ................ | G06F 11/1469 |
| 9,645,893 B1 * | 5/2017 | Hebbar | ................ | G06F 11/1469 |
| 9,667,725 B1 * | 5/2017 | Khanduja | ............ | H04L 67/1097 |
| 9,778,956 B1 * | 10/2017 | Harwood | .............. | G06F 9/4881 |
| 2002/0019870 A1 * | 2/2002 | Chirashnya | ......... | H04L 41/0681 709/224 |
| 2005/0021485 A1 * | 1/2005 | Nodelman et al. | .............. | 706/21 |
| 2009/0089252 A1 * | 4/2009 | Galitsky et al. | ................... | 707/3 |
| 2011/0055138 A1 * | 3/2011 | Khanduja | ................ | G06F 11/30 706/47 |
| 2012/0078903 A1 * | 3/2012 | Bergstein | ............ | G06F 11/0724 707/737 |

(Continued)

OTHER PUBLICATIONS iTrack: Correlating user activity with system data Vijay Mann; Anilkumar Vishnoi 2012 IEEE Network Operations and Management Symposium Year: 2012 pp. 1068-1074 IEEE Conference Publications.*

(Continued)

*Primary Examiner* — Michael B. Holmes

(57) ABSTRACT

An exemplary embodiment of the present invention provides a method of processing network activity data. The method includes receiving network activity data and generating an event based on the network activity data. The method also includes generating a probability based at least in part on Bayesian statistics, the probability corresponding to a likelihood that the event caused or was caused by another event. The method also includes generating an event message corresponding to the event based on the probability.

20 Claims, 3 Drawing Sheets

(56) References Cited

U.S. PATENT DOCUMENTS

| | | | | |
|---|---|---|---|---|
| 2012/0078912 | A1* | 3/2012 | Gupta | G06F 11/3006 |
| | | | | 707/740 |
| 2013/0336168 | A1* | 12/2013 | Schlipf | H04L 41/0813 |
| | | | | 370/255 |

OTHER PUBLICATIONS

Integrated geo-sensing: A case study on the relationships between weather and mobile phone usage in Northern Italy Guenther Sagl; Euro Beinat; Bernd Resch; Thomas Blaschke Proceedings 2011 IEEE International Conference on Spatial Data Mining and Geographical Knowledge Services Year: 2011 pp. 208-213 IEEE Conference Publications.*

Analysis and Design of Adaptive OCDMA Passive Optical Networks Mohammad Hadi; Mohammad Reza Pakravan Journal of Lightwave Technology Year: 2017, vol. 35, Issue: 14 pp. 2853-2863 IEEE Journals & Magazines.*

Public information exposure detection: Helping users understand their web footprints Lisa Singh; Grace Hui Yang; Micah Sherr; Andrew Hian-Cheong; Kevin Tian; Janet Zhu; Sicong Zhang 2015 IEEE/ACM International Conference on Advances in Social Networks Analysis and Mining (ASONAM) pp. 153-161 IEEE Conference Publications.*

Williams, David, et al., Cool Vendors in IT Operations Management 2007, Published by Gartner, Inc., Mar. 7, 2007, ID No. G00146238, pp. 1-6.

Hewlett-Packard Development Company, L.P., 2007, "HP Open View Products," Available at http://web.archive.org/web/20071009112844/http://www.openview.hp.com/products/index.html. (Lasted accessed on Mar. 4, 2010).

Information Technology Infrastructure Library (ITIL), "What is ITIL?", Available at http://www.itil-officialsite.com/AboutITIL/WhatisITIL.asp (Last accessed on Mar. 4, 2010), APM Group Limited, Sword House, Totteridge Road, High Wycombe, Buckinghamshire, UK, Oct. 2007, Registered in England No. 2861902.

SQLITE, Available at http://www.sqlite.org/ (Last accessed on Mar. 4, 2010).

Stanford Encyclopedia of Philosophy, "Bayes' Theorem," Metaphysics Research Lab, CSLI, Stanford University, Jan. 28, 2003, Available at http://plato.stanford.edu/entries/bayes-theorem/ (Last accessed on Mar. 4, 2010).

* cited by examiner

METHOD AND SYSTEM FOR PROCESSING NETWORK ACTIVITY DATA

BACKGROUND

A computer network is generally a group of interconnected computers and other devices, such as printers, external hard drives, modems, hubs, switches, bridges, routers, and so on. The network facilitates communication between the computers and also with external networks, such as the internet. Networks may be classified according to a wide variety of characteristics, such as the hardware and software technology used to interconnect the individual devices in the network.

A data center or datacenter is a facility used to house computer networks, computer systems and associated components, such as telecommunications and storage systems. It may include redundant or backup power supplies, redundant data communications connections, environmental controls (for example, air conditioning, fire suppression, or the like) and security devices. In some cases, a network monitor may be employed to ensure optimum utilization of network resources. The network monitor may collect data regarding the operating conditions of the network, and bring problematic network events to the attention of a network administrator.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present invention provide techniques for generating network events. As used herein, the term "event" refers to any specified network activity that may be provided to a network administrator and may include a status change, a crossed threshold, the initiation or completion of a task, and the like. For example, an event trigger may be defined as a utilization of a server's central processing unit (CPU) rising above 80%. As such, if the server's CPU utilization rises above 80%, an event may be generated and displayed in an event browser. The number of events generated for a typical network may be extremely large and, thus, the human interpretation of events may be a very labor intensive process. In exemplary embodiments of the present invention, the processing of events may be automated so that the events are prioritized before human interpretation.

Exemplary embodiments of the present invention use causal models to correlate network activity and identify symptom and cause relationships between network events. The relationships in the causal models may be assigned a probability representing the probability of a causal relationship between the symptom event and the cause event. In some exemplary embodiments, Bayesian probability theorems may be used to generate a probabilistic correlation between each symptom and causal relationship, and the probabilities may be refined as more network activity data becomes available. Based on the probabilistic correlation between the various symptom events and cause events, event messages may be generated, prioritized, and either conveyed or suppressed. In this way, the more relevant events may be brought to the attention of a network administrator, while less significant events may be de-emphasized.

Figure 1:
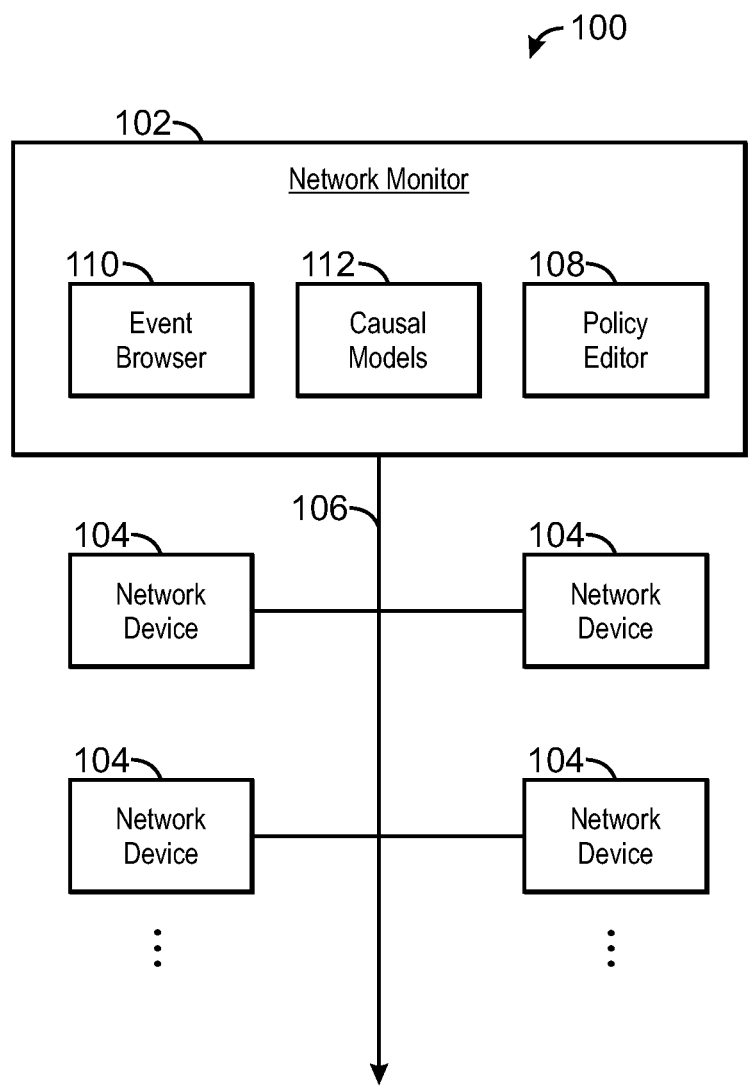
FIG. 1 is a block diagram of a computer network system having an network monitor, in accordance with an exemplary embodiment of the present invention.

FIG. 1 is a block diagram of a computer network system having an network monitor, in accordance with an exemplary embodiment of the present invention. The computer network system is generally referred to by the reference number 100 and may include a network monitor 102 and a plurality of network devices 104. In some exemplary embodiments, the network monitor 102 may be a software application that is stored in a tangible, machine-readable medium and executed by a processor. For example, the network monitor may be an application running on a network server, a client system, and the like.

The network devices 104 may be any suitable electronic or virtual device that may be communicatively coupled to the network monitor 102, for example, servers, routers, switches, printers, network interface cards (NICs), client computers, storage devices, database management systems (DBMS), application servers, and the like. The network devices 104 may also include printers, scanners, and other peripherals. The network devices 104 may be coupled to each other and other units by a network backbone 106. In some exemplary embodiments, one or more of the network devices 104 may communicate via structured query language (SQL) instructions. Together the network devices 104 may form an information technology (IT) infrastructure such as a datacenter. Further, it should be noted that the system 100 can be more complex than depicted, such as having sub branches with additional devices, connections to an external network such as the Internet, and so on.

In exemplary embodiments of the present inventions, the network monitor 102 may monitor the network traffic being transmitted over the computer network system 100. Additionally, some or all of the network devices 104 may include a reporting agent that transmits network activity data to the network monitor 102. Information reported to the network monitor 102 by the network devices 104 may include changes in status, task initiations and completions, data transmission rates, errors, time-outs, and the like. Additionally, the network devices 104 may also send a copy of the data being sent or received by the network device 104 to the network monitor 102. Further, the network monitor 102 may receive network activity data from the server such as the CPU utilization.

The operation manager may include a policy editor 108 that may be used to specify the conditions that may generate an event. For example, the policy editor 108 may be used to specify a CPU utilization rate that may trigger the generation of an event. The event generation policies may be specified by an administrator or other user of the network monitor 102. Additionally, the network monitor 102 may also include an event browser 110 that may be used to display the conveyed events.

Further, the network monitor 102 may also include a database of causal models 112. Each causal model 112 may include sets of rules regarding the behavior of the network, applications running on the network, and the like. The causal model defines a graph of cause and effect relationships between events that may occur on the various network devices 104. Accordingly, each node of the causal model may be associated with an event and probability that two events have a cause and effect relationship. The probabilities associated with each node may be may be refined over time as more network activity data is obtained and processed. As will be discussed further below, the causal models may be used to determine the probability of a cause and effect relationship between events based on new evidence obtained from the network activity data. In some exemplary embodiments, the network monitor 102 may also include a topology model that represents the actual IT environment. The topology model is an instantiation of the object types used in the causal model and may be used to compliment the causal model. The topology model may be provided by a Configuration Management Database (CMDB) application.

Figure 2:
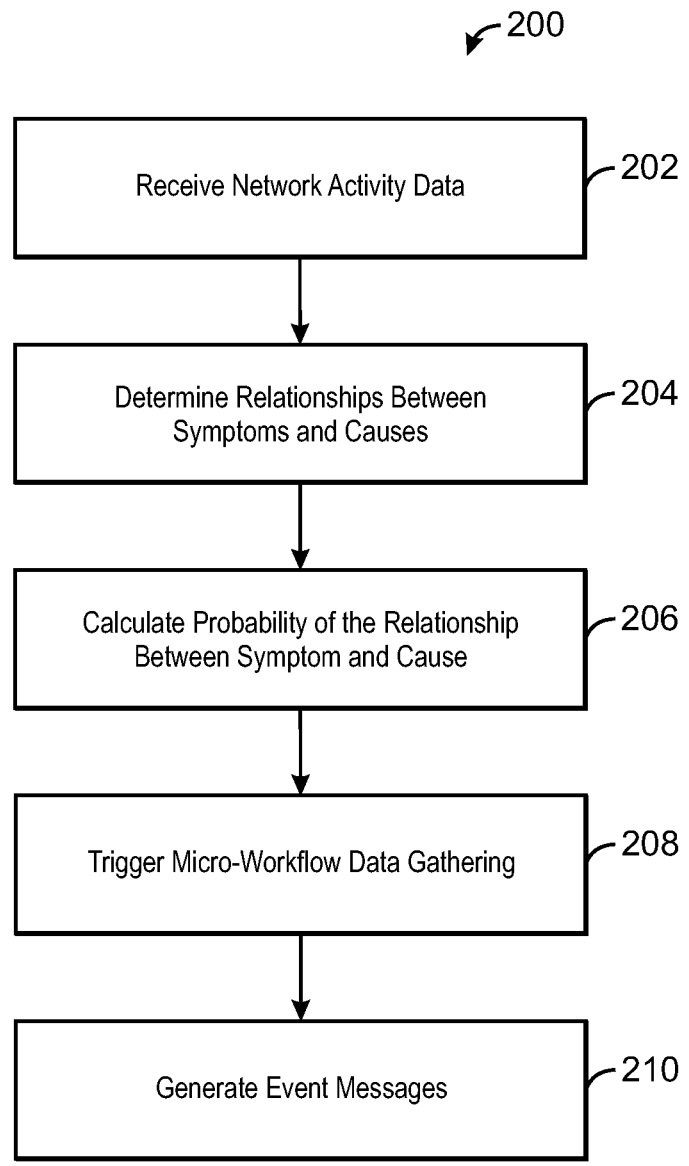
FIG. 2 is a process flow diagram of a method of processing network activity data, in accordance with an exemplary embodiment of the present invention.

FIG. 2 is a process flow diagram of a method of processing network activity data, in accordance with an exemplary embodiment of the present invention. The method is generally referred to by the reference number 200 and may begin at block 202, wherein the network monitor 102 (referring also to FIG. 1) receives network activity data from the network devices 104. The network activity data may be any type of information that may relate to a state of the network or a network concern.

Examples of network activity data that may be received include device status, task initiation and completion, task failure, transmission rates, SQL instructions, processor utilization, memory utilization, error messages, and the like. Based on the network activity data and the rules specified through the policy editor, the network monitor 102 may generate events. Some of the events may be potential cause events, for example, a specific SQL operation or failure of a network interface, and some of the events may be potential symptom events, for example, server CPU utilization increasing beyond eighty percent.

At block 204, the events may be processed to create relationships between potential symptom events and potential cause events. In exemplary embodiments of the present invention, the relationships between symptom and causes events may be established by identifying the event in the causal models 112. Each event may be identified within the causal models 112 as a symptom event or a cause event. Each cause event may be associated with a potential symptom event that is identified in the causal models, and each symptom event may be associated with a potential cause event that is identified in the causal models. Further, an initial probability associated with the symptom and cause events may also be retrieved from the causal models.

At block 206, the probability of a causal relationship between the symptom event and the cause event may be determined based on the initial probability and the network activity data, which provides new evidence to support or counter the causal relationship as defined by the causal models 112. Upon receiving a symptom event, the network monitor 102 may evaluate the series of events leading up to a symptom event to determine if the potential cause event actually occurred within a specified time period prior to the occurrence of the symptom event. The actual occurrence of the potential cause event, or lack thereof, may be used to alter the probability associated with the cause event and the symptom event in the causal model. Similarly, upon receiving a cause event, the network monitor 102 may evaluate the series of events following the cause to determine if the potential symptom actually occurred within a specified time period after the occurrence of the cause event. The actual occurrence of the potential symptom, or lack thereof, may be used to alter the probability associated between the cause event and the symptom event in the causal model. The new probability calculation may then be added to the causal model, taking the place of the initial or previous probability. In this way, the causal model may be refined as new network activity data becomes available.

In exemplary embodiments of the present invention, the updated probability of a causal relationship between a symptom event and a cause event may be calculated using Bayes' rule, which calculates probabilities given new evidence according to the following formula:

$$P(H_0|E)=P(E|H_0)P(H_0)/P(E)$$

In the above formula, $H_0$ represents a hypothesis, called a null hypothesis, that was inferred before the new evidence became available. The factor E represents the new evidence, which is determined based on whether the potential cause or symptom actually occurred, as discussed above. $P(H_0)$ is the prior probability of $H_0$, which is downloaded from the causal model. $P(E|H_0)$ is called the conditional probability of seeing the evidence E given that the hypothesis $H_0$ is true. $P(E|H_0)$ is also called the likelihood function when it is expressed as a function of E given $H_0$. $P(E)$ is called the marginal probability of E, which is the probability of witnessing the new evidence E under all mutually exclusive hypotheses. $P(E)$ can be calculated as the sum of the product of all probabilities of mutually exclusive hypotheses and corresponding conditional probabilities, which may be expressed as $P(E|H_i)P(H_i)$. $P(H_0|E)$ is called the posterior probability of $H_0$ given E, and is the value that is added to the causal model and takes the place of the prior probability. The factor $P(E|H_0)/P(E)$ represents the effect that the new evidence has on the belief in the hypothesis. If it is likely that the evidence will be observed when the hypothesis under consideration is true, then this factor will be large.

To further illustrate the above probability calculations, a specific example is provided using a cause event, "SQL," and a symptom event, "CPU." The SQL event represents an event that is generated in response to a slow SQL query response time. The CPU event represents an event that is generated in response to the CPU being over or under utilized. Upon the detection of one or both of these events, the Bayesian probabilities associated with these events may be updated in the causal models, for example, as discussed below. In one exemplary embodiment, the probability of the CPU utilization going high when SQL query was executed may be calculated according to the formula:

$$P(CPU|SQL)=P(CPU \text{ intersection } SQL)/P(CPU)$$

The probability that the SQL statements execution was slow due to a high CPU load may be calculated according to the formula:

$$P(SQL|CPU)=P(CPU|SQL)*P(SQL)/P(CPU)$$

In the above formulas, P(CPU) is the probability of the CPU utilization going down, and P(SQL) is the probability of a slow response from an SQL query.

At block 208, a determination is made regarding whether to trigger micro-workflow data gathering. In exemplary embodiments of the present invention, micro-workflow data gathering may be triggered if the probability associated with a specific cause event and symptom event is high, for example, greater than about 50, 60, 75, or 90 percent. In some embodiments, the probability that triggers the micro-workflow data gathering may be user-defined. The micro-workflow data gathering provides a fine-grained data gathering that may be useful to a network administrator in diagnosing problems. When the micro-workflow data gathering is triggered, the network monitor 102 may send a message to one or more of the network devices 104 requesting the network devices 104 to provide more detailed information, for example, copies of SQL instructions, copies of data packets, processes running, device status information such as whether a network interface is operable, number of threads in a pool, and the like. Data gathered during micro-workflow data gathering may be stored to a log file and associated with the event or events that triggered the micro-workflow data gathering. The micro-workflow data may also be displayed by the network monitor 102 in the event browser 110.

At block 210, the network monitor 102 may generate event messages. The event messages may be used to convey events that may be relevant to a network administrator. The event messages may include a description of both events and an explanation of the relationship between the two events, including which event is the cause event, which event is the symptom event, and the probability that the symptom event was caused by the cause. The substance of each event message may be determined individually depending, in part, on the whether a cause event or symptom event were detected and the probability associated with the cause events and symptom events. In exemplary embodiments of the present invention, if a symptom event and an associated cause event both occur, then an event message is generated regarding both events.

If a potential cause occurs but the associated symptom does not occur, then the generation of an event message may depend on the probability associated with the cause event and associated symptom event. If the probability is low, for example, less than about 50 percent, then the event may be suppressed and an event message may not be generated for the event. If on the other hand, the probability associated with the cause event and the associated symptom event is high, for example, greater than about 50 percent an event message may be generated regarding the cause event that includes a warning message regarding the potential symptom.

Similarly, if a potential symptom event occurs but the associated cause event does not occur, then the generation of an event message may depend on the probability associated with the cause event and associated symptom event. If the probability is low then an event message may be generated for the symptom event that does not include an explanation as to a cause. If on the other hand, the probability associated with the cause event and the associated symptom event is high, an event message may be generated regarding the symptom event that includes a warning message regarding the potential cause. In some embodiments, the probabilities associated with the generation of an event message may be user defined.

In some exemplary embodiments of the present invention, the event messages may be assigned a rank based on the importance of the event. The importance of the event may relate to the severity of the event or the probability assigned to the event. For example, if a symptom event and associated cause event have a high probabilistic correlation, the ranking of the event may be increased. The increased rank may result in the event being more likely to reach the attention of a user. For example, the higher ranked events may be displayed higher in a list of events displayed by the event browser 110 compared to lower ranked events. In this way, events that have a known cause may be more likely to be addressed by a network administrator.

Figure 3:
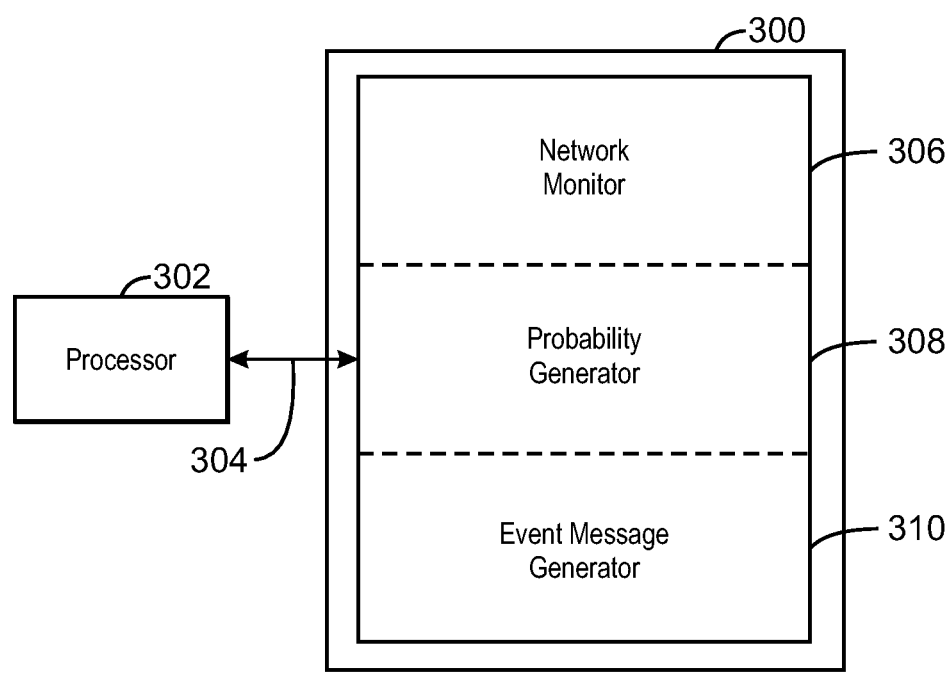
FIG. 3 is a block diagram showing a tangible, machine-readable medium that stores code adapted to process network activity data, in accordance with exemplary embodiments of the present invention.

FIG. 3 is a block diagram showing a tangible, machine-readable medium that stores code adapted to process network activity data, in accordance with exemplary embodiments of the present. The tangible, machine-readable medium is generally referred to by the reference number 300. The tangible, machine-readable medium 300 can comprise RAM, a hard disk drive, an array of hard disk drives, an optical drive, an array of optical drives, a non-volatile memory, a USB drive, a DVD, a CD, and the like. In one exemplary embodiment of the present invention, the tangible, machine-readable medium 300 can be accessed by a processor 302 over a network or bus 304.

The various software components discussed herein can be stored on the tangible, machine-readable medium 300 as indicated in FIG. 3. For example, a first block 306 on the tangible, machine-readable medium 300 may store a network monitor adapted to receive network activity data and generate events. A second block 308 can include a probability generator adapted to estimate a probability corresponding to a likelihood of a cause and effect relationship between two or more of the events. The probability generator may also assign the probability to the two or more events by storing the probability to a causal model that defines the relationship between the events. A third block 310 can include an event message generator configured to receive the events and convey or suppress the events based on the new probability. The tangible, machine-readable medium 300 may also include other software components, for example, a policy editor adapted to allow a user to specify network activity that may cause an event to be generated.

Although shown as contiguous blocks, the software components can be stored in any order or configuration. For example, if the tangible, machine-readable medium 300 is a hard drive, the software components can be stored in non-contiguous, or even overlapping, sectors.

What is claimed is:

1. A method of processing network activity data corresponding to a computer network, comprising:
    receiving network activity data from a network device on the computer network;
    generating, by a processor, an event corresponding to the network activity data and user defined network activity conditions, wherein the user defined network activity conditions cause the network monitor to generate the event;
    generating, by the processor, a probability based at least in part on Bayesian statistics, the probability corresponding to a likelihood that the event was a potential cause of or a potential symptom of another event; and
    generating by the processor, an event message corresponding to the event based on the probability.

2. The method of claim 1, wherein generating the probability comprises receiving an initial probability and generating the probability based on the initial probability and new evidence, the new evidence comprising the occurrence or non-occurrence of the other event within a specified time period.

3. The method of claim 2, comprising updating the initial probability with the generated probability.

4. The method of claim 2, wherein receiving an initial probability comprises receiving the initial probability from a causal model that provides possible cause and effect relationships between events.

5. The method of claim 1, wherein the event comprises a cause event and generating an event message comprises generating an event message if the probability is greater than about 50 percent.

6. The method of claim 1, wherein the event comprises a symptom event and generating the event message comprises attaching a warning about the potential cause event if the probability is greater than about 80 percent.

7. The method of claim 1, comprising sending the event message to an event browser.

8. The method of claim 1, comprising triggering micro-workflow data gathering if the probability is greater than about 80 percent.

9. The method of claim 1, comprising suppressing the event if a symptom event is not detected within a specified time period and the probability is less than about 50 percent.

10. A computer system, comprising:
a processor that is adapted to execute machine-readable instructions; and
a storage device that is adapted to store data, the data comprising a memory device that stores instructions that are executable by the processor, the instructions comprising:
a network monitor adapted to receive network activity data and generate events;
a probability generator adapted to estimate a Bayesian probability and assign the Bayesian probability to a grouping of two or more events, the Bayesian probability corresponding to a likelihood of a cause and effect relationship between the two or more events;
an event message generator configured to receive the events and convey or suppress the events based on the Bayesian probability; and
a policy editor adapted to allow a user of the computer system to define network activity conditions that will cause the network monitor to generate the events.

11. The computer system of claim 10, comprising a micro-workflow receiver adapted to receive fine-grained network activity data if a symptom event is generated and the Bayesian probability is greater than about 75 percent.

12. The computer system of claim 10, comprising a causal model adapted to identify a potential cause and effect relationship between two or more of the events.

13. The computer system of claim 12, wherein the probability generator is adapted to receive an initial probability from the causal model and store a new estimated probability to the causal model in place of the initial probability.

14. The computer system of claim 10, wherein the event message generator conveys a cause event if a corresponding symptom event is generated by the network monitor within a specified time period, or if the Bayesian probability assigned to the cause event and the corresponding symptom event is greater than about 50 percent.

15. The computer system of claim 10, wherein the event message generator conveys a symptom event and attaches a warning about a potential cause event if the Bayesian probability assigned to the symptom event and the corresponding cause event is greater than about 50 percent.

16. The computer system of claim 10, wherein the event message generator suppresses a cause event if a corresponding symptom event is not generated by the network monitor within a specified time period, and the Bayesian probability assigned to the cause event and the corresponding symptom event is less than about 50 percent.

17. A non-transitory tangible, computer-readable medium, comprising code configured to direct a processor to:
receive network activity data and generate events based on the network activity data and user defined policies, wherein the user defined policies include network activity conditions that will cause the events to be generated;
estimate a Bayesian probability and assign the Bayesian probability to a grouping of two or more events, the Bayesian probability corresponding to a likelihood of a cause and effect relationship between the two or more events; and
receive the events and convey or suppress the events based on the Bayesian probability.

18. The non-transitory tangible, computer-readable medium of claim 17, comprising code configured to direct a processor to receive fine-grained network activity data if a symptom event is generated and the Bayesian probability is greater than about 75 percent.

19. The non-transitory tangible, computer-readable medium of claim 17, comprising code configured to direct a processor to receive an initial probability from a causal model, estimate a new probability, and store the new probability to the causal model in place of the initial probability.

20. The method of claim 1, wherein the event comprises a cause event and generating an event message comprises generating an event message if the probability is greater than 50 percent.

* * * * *